Sept. 2, 1952 G. P. WAKEFIELD 2,608,706
CANNED FOOD SERVER
Filed April 19, 1950
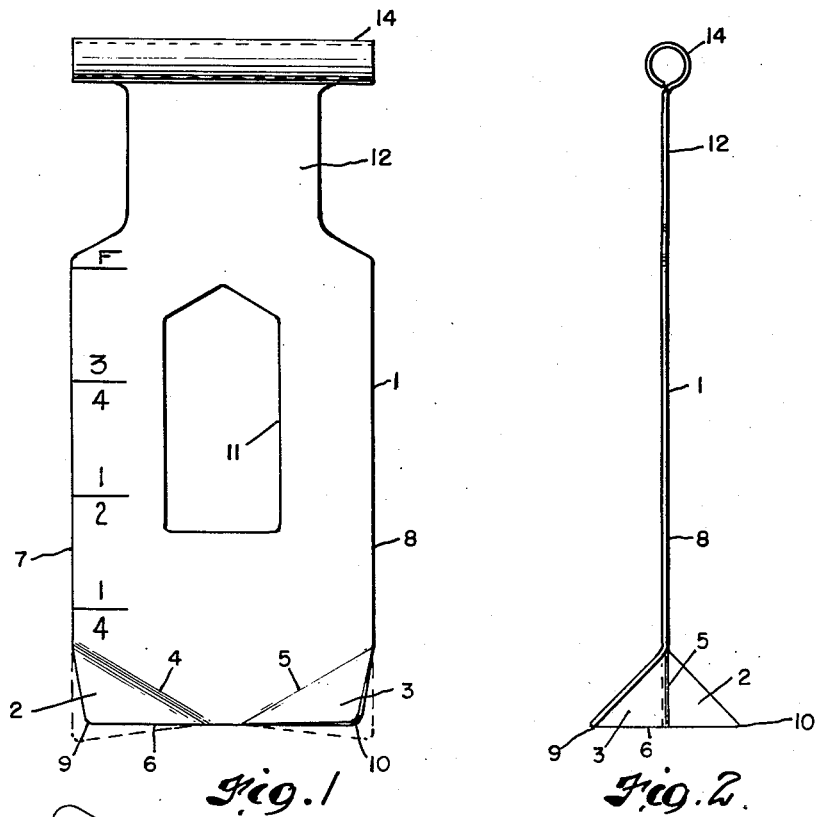
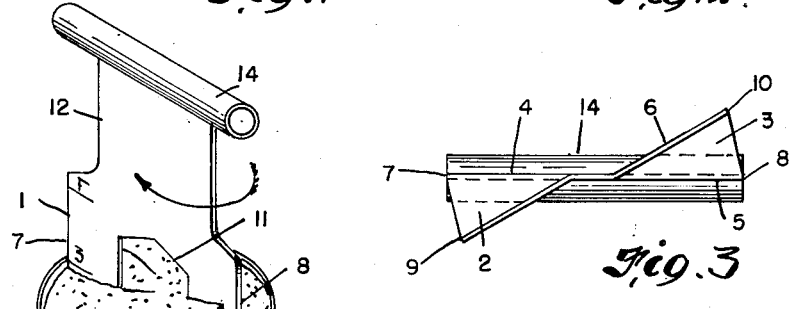
INVENTOR.
GEORGE P. WAKEFIELD
BY
Oberlin + Limbach
ATTORNEYS.

Patented Sept. 2, 1952

2,608,706

UNITED STATES PATENT OFFICE 2,608,706

CANNED FOOD SERVER

George P. Wakefield, Vermilion, Ohio

Application April 19, 1950, Serial No. 156,813

4 Claims. (Cl. 15—236)

The present invention relates generally as indicated to a canned food server and is more particularly concerned with a server for removing pet food or canned goods of similar semi-solid consistency from the cans in which packed, such foods or goods being rather difficult to scoop and scrape from the cans with a spoon, table knife or like kitchen utensil.

It is a primary object of this invention to provide a server of the character indicated which is of simple form and economical to manufacture and which greatly eases the task of removing such semi-solid canned goods from the cans.

Another object of this invention is to provide a server which enables serving of predetermined quantities of such canned goods, including the entire quantity thereof if desired and which enables scraping clean of the side and bottom walls of the can to thus minimize waste.

Another object of this invention is to provide a server of form such that the canned goods are readily removable therefrom.

Another object of this invention is to provide a server of unitary form which may be used for several different purposes, viz, for removing the severed ends of cans, for pushing the canned goods through cans having both ends severed, and for turning out the canned goods by inserting the server into the open end of a can and turning the server while it is advanced axially of the can.

Other objects and advantages will become apparent from the following description.

To the accomplishment of the foregoing and related ends, said invention then comprises the features hereinafter fully described and particularly pointed out in the claims, the following description and the annexed drawing setting forth in detail an illustrative embodiment of the invention, this being indicative, however, of but one of the various ways in which the principle of the invention may be employed.

In said annexed drawing:

Fig. 1 is a front elevation view of a preferred form of server showing in dotted outline the original flat shape thereof prior to bending or twisting of the lower end portion into auger-like form;

Fig. 2 is a side elevation view as viewed from the right-hand side of Fig. 1;

Fig. 3 is a bottom plan view as viewed upwardly from beneath Fig. 1; and

Fig. 4 is a perspective view illustrating the server in use for turning out semi-solid canned goods from a cylindrical can.

Referring now more specifically to the drawing, the server is shown as comprising a generally rectangular body 1 of plate-like or blade-like form and of width corresponding to the diameter of the can C from which the canned goods are to be removed and of length exceeding the height of such can C.

The lower end of said body 1 is of a generally twisted form with the lower triangular areas 2 and 3 thereof bent along diverging lines 4 and 5 which extend upwardly and outwardly from points adjacent the center of the bottom edge 6 to the opposite parallel side edges 7 and 8 respectively whereby to define triangular lips 2 and 3. Said lips 2 and 3 constituting a twisted end portion of said body 1, are preferably bent so as to intersect the plane of said body 1 at an obtuse angle, for example, 135° as shown. As evident, said twisted end portion, as defined by the lips 2 and 3 constitutes an auger to advance said body 1 into the canned goods in the can C upon insertion of said body into the open end of the can and upon rotation of said body when thus inserted.

Said body 1 is preferably marked ¼, ½, ¾ and F so that the feeding movement thereof into the can C may be stopped at any desired point for withdrawing a predetermined quantity of the canned goods from the can.

In order that the distance between the lower corners 9 and 10 be the same as the width of said body 1 between side edges 7 and 8, the bend lines 4 and 5 commence a slight distance from the longitudinal axis of said body. In other words, the corners 9 and 10 and the opposite side edges of said lips 2 and 3 are circumscribed by a circle of a diameter substantially equal to the width of said body 1 whereby rotation of the server in the can C, which is of diameter corresponding to the width of the server, effects clean scraping of the canned goods from the side wall of the can.

The initial flat form of the server is shown in dotted outline in Fig. 1 as having its bottom edge 6 of slight inverted V-shape so that when the lips 2 and 3 are formed, the bottom edge 6 will lie in a plane perpendicular to the plane of said body, such bottom edge 6 therefore being operative to cleanly scrape the canned goods from the bottom of the can C when the server is inserted into and rotated in the can.

Said body 1 is further formed with a slot 11 centrally therethrough of width equal to approximately one-third the width of the body and extending longitudinally of the body from between the ¼ and ½ marks almost to the "F" mark. It has been found that by providing such slot 11, the canned goods, after removal from the can by means of the server, are more readily stripped from the server. Moreover, the server is rendered more readily cleanable by reducing the area thereof to which the food or canned goods may stick.

The upper portion 12 of said body 1 is reduced in width to define a neck portion and the upper end is curled to provide a hand grip 14, said hand grip preferably being of a width the same as that of the body 1. The provision of the hand grip 14 and the neck portion 12 renders the server more convenient to use without danger of injuring the hand of the user and enables exertion of greater forces with the server than would be possible with a blade-like server not having such neck portion and hand grip.

With one end of the can C severed, the corner 9 or 10 of the server may be used for prying out the severed lid. With the lid of the can thus removed, the server may be inserted into the semi-solid canned goods and rotated about its longitudinal axis, the auger defined by the twisted end portion or the lips 2 and 3 operating to turn out the goods and to advance the server to a desired depth into the goods. During this operation, the cylindrical mass of canned goods parted diametrically by said server is rotated in unison with the server and the parallel side edges 7 and 8 of said body 1 operate to scrape clean the cylindrical side wall of the can C. When the server has been advanced to a desired depth, the same is withdrawn from the can thereby withdrawing with it the desired quantity of canned goods. In some instances where the canned goods do not stick to the server, the canned goods will be curled and turned out of the can in much the same manner as a drill chip curls and passes through the flutes of a twist drill during the rotation of the latter in a body of metal. With canned goods of this nature, the can C may be held in a horizontal or inclined position whereby the canned goods will be deposited directly into a suitable receptacle. Of course, with canned goods of a thick, pasty consistency which have a tendency of sticking to the server, the withdrawal of the server will withdraw the canned goods therewith and makes it necessary to rap the server against the receptacle or to strip the canned goods from the server as by running the server on an edge of the receptacle or scraping the server with a table knife or with the fingers.

Instead of using the server in the manner indicated above, that is, as a pry to remove the severed lid of a can and as an auger to turn out canned goods from a can, the server may be used as a pusher to eject the canned goods from a can having both ends severed by applying endwise pressure with the server against one of the severed lids of the can. In such last-mentioned use, because the server is of width equal to the diameter of the can C, there is provided a guiding effect to maintain the server diametrically of the can.

Other modes of applying the principle of my invention may be employed instead of the one explained, change being made as regards the process herein disclosed or the materials employed in carrying out the process, provided the step or steps stated by any of the following claims or the equivalent of such stated step or steps be employed.

I therefore particularly point out and distinctly claim as my invention:

1. A server for semi-solid canned goods comprising a relatively thin, substantially flat, and generally rectangular body having a twisted end portion constituting an auger, said server being adapted to be inserted into and rotated in a cylindrical can of diameter corresponding to the width of said body to turn out the goods from such can, such auger being defined by oppositely inclined lips bent from said body along lines diverging from the central portion of the end edge of said body at an angle less than 180°, such lips having side edges and end edges terminating in corners circumscribed by a circle of diameter substantially equal to the width of said body.

2. A server for semi-solid canned goods comprising a relatively thin, substantially flat, and generally rectangular body having a twisted end portion constituting an auger, said server being adapted to be inserted into and rotated in a cylindrical can of diameter corresponding to the width of said body to turn out the goods from such can, such auger being defined by oppositely inclined lips bent from said body along lines diverging from the central portion of the end edge of said body at an angle less than 180°, such lips having side edges and end edges terminating in corners circumscribed by a circle of diameter substantially equal to the width of said body, such end edges lying in a plane perpendicular to the plane of said body whereby to enable scraping the bottom of the can.

3. A server for semi-solid canned goods comprising a relatively thin, substantially flat, and generally rectangular body having a twisted end portion constituting an auger, said server being adapted to be inserted into and rotated in a cylindrical can of diameter corresponding to the width of said body to turn out the goods from such can, such auger being defined by oppositely inclined lips bent from said body along lines diverging from spaced points adjacent the central portion of the end edge of said body at an angle less than 180°, such lips having side edges and end edges terminating in corners circumscribed by a circle of diameter substantially equal to the width of said body.

4. A server for semi-solid canned goods comprising a relatively thin, substantially flat, and generally rectangular body having a twisted end portion constituting an auger, said server being adapted to be inserted into and rotated in a cylindrical can of diameter corresponding to the width of said body to turn out the goods from such can, such auger being defined by oppositely inclined triangular lips intersecting said body along lines diverging from spaced points adjacent the central portion of the end edge of said body at an angle less than 180°, such lips having end edges and side edges terminating in corners circumscribed by a circle of diameter substantially equal to the width of said body, such end edges lying in a plane perpendicular to the plane of said body whereby to enable scraping the bottom of the can.

GEORGE P. WAKEFIELD.

REFERENCES CITED

The following references are of record in the file of this patent:

UNITED STATES PATENTS

| Number | Name | Date |
|---|---|---|
| D. 52,990 | Graham | Feb. 11, 1919 |
| 365,247 | Elliott | June 21, 1887 |
| 750,459 | Johnson | Jan. 26, 1904 |
| 1,601,855 | Davis | Oct. 5, 1926 |
| 1,797,690 | McLean | Mar. 24, 1931 |
| 1,837,484 | Reimer | Dec. 22, 1931 |
| 2,046,334 | Loeber | July 7, 1936 |
| 2,294,096 | Rice | Aug. 25, 1942 |